United States Patent [19]
Zichichi et al.

[11] Patent Number: 5,738,367
[45] Date of Patent: Apr. 14, 1998

[54] AUTOMOTIVE INTERIOR TRIM PIECE HAVING AN ARRANGEMENT FOR FORMING AN AIR BAG DEPLOYMENT OPENING

[75] Inventors: Andrew W. Zichichi, Bloomfield Hills; David J. Bauer, deceased, late of West Bloomfield; John W. Bauer, Jr., legal representative, Allen Park; Kenneth J. Barnes, Shelby Township; Michael P. Towler, Ann Arbor, all of Mich.

[73] Assignee: Tip Engineering Group, Inc., Farmington Hills, Mich.

[21] Appl. No.: 799,989

[22] Filed: Feb. 13, 1997

Related U.S. Application Data

[63] Continuation of Ser. No. 490,735, Jun. 15, 1995, abandoned.
[51] Int. Cl.⁶ .................................................. B60R 21/16
[52] U.S. Cl. .................................................. 280/728.3
[58] Field of Search .......................... 280/728.1, 728.3, 280/732, 731

[56] References Cited

U.S. PATENT DOCUMENTS

| | | | |
|---|---|---|---|
| 4,246,213 | 1/1981 | Takamatsu et al. | 280/728.3 |
| 5,096,221 | 3/1992 | Combs et al. | 280/728.3 |
| 5,131,678 | 7/1992 | Gardner et al. | 280/728.3 |
| 5,429,385 | 7/1995 | Kamiji et al. | 280/728.3 |
| 5,447,327 | 9/1995 | Jarboe et al. | 280/728.3 |

FOREIGN PATENT DOCUMENTS

| | | | |
|---|---|---|---|
| 2270884 | 3/1994 | United Kingdom | 280/728.3 |

*Primary Examiner*—Eric D. Culbreth
*Attorney, Agent, or Firm*—John R. Benefiel

[57] ABSTRACT

An arrangement and method are disclosed for enabling formation of a deployment opening for an air bag in a hard plastic trim piece with or without vinyl cladding in which a hinged reinforcing patch panel is fixedly attached to a section of the hard plastic defined by a preweakening groove pattern.

18 Claims, 2 Drawing Sheets

AUTOMOTIVE INTERIOR TRIM PIECE HAVING AN ARRANGEMENT FOR FORMING AN AIR BAG DEPLOYMENT OPENING

This is a continuation of application Ser. No. 08/490,735, filed on Jun. 15, 1995, now abandoned.

BACKGROUND OF THE INVENTION

This invention concerns automotive trim structures which enclose air bag installations. Air bag installations are conventionally stowed behind various interior trim structures, i.e., a steering wheel cover for the driver side air bag and the instrument panel for the passenger side air bag. Side air bag installations may be stowed behind door panel structures.

When air bag systems were first installed in automotive vehicles on the passenger side, one or more visible deployment door panels were fit into an opening in the trim structure. The door panel was forced to hinge open as the air bag inflated by pressure exerted by the air bag itself.

Examples of such installations are described in U.S. Pat. No. 4,893,833 issued on Jan. 16, 1990 for "Closure for an Air Bag Deployment Opening" and U.S. Pat. No. 4,989,896 issued on Feb. 5, 1991 for "Double Door Closure For an Air Bag Deployment Opening."

It has heretofore been recognized that an "invisible seam" installation is preferable for aesthetic purposes, as well as to minimize temptation to tamper with the air bag, since its presence is thus not made conspicuous. The absence of any indication of its presence also is preferable to some people so as to minimize any apprehension as to its possible deployment.

U.S. Pat. Nos. 4,991,870 issued on Feb. 12, 1991 for "Method and Arrangement For Forming an Air Bag Deployment Opening in an Auto Interior Trim Piece," 5,080,393 issued on Jan. 14, 1992 for "Method and Apparatus For Forming an Air Bag Deployment Opening," 5,082,310 issued on Jan. 21, 1992 for "Arrangement For Providing an Air Bag Deployment Opening," 5,217,244 issued on Jun. 8, 1993 for "Arrangement For Forming an Air Bag Deployment Opening," 5,342,088 issued on Aug. 30, 1994 for "Deployment Door Patterns For an Air Bag Safety System," 5,375,875 issued on Dec. 27, 1994 for "Two Stage Cutter Arrangement For Forming an Air Bag Deployment Opening," 5,375,876 issued on Dec. 27, 1994 for "Air Bag Deployment Door Installation," and 5,393,088 issued on Feb. 28, 1995 for "Invisible Seam Deployment Door Installation With Stabilized Air Bag Deployment Opening Construction" all describe invisible seam installations for trim pieces of a so-called skin and foam construction, in which a foam layer is molded over a rigid substrate, with a vinyl skin layer molded over the foam.

The skin and foam construction of the trim piece is most common in current automotive trim manufacture technology for higher quality vehicles.

However, many vehicles have an interior trim construction referred to as vinyl clad, and some utilize painted and grained hard plastic.

In vinyl clad construction, a rigid substrate is covered with a layer of vinyl (which may include a thin layer of foam backing) and is vacuum formed over the substrate to establish a cosmetic appearance.

In painted and grained hard plastic trim pieces, the substrate surface is simply given a texturizing treatment and painted to provide a cosmetic finish at low cost.

One or more deployment door panels could be formed in the substrate by cutting into the substrate, but the connected side of the door panels could possibly tear free upon being impacted by the inflating air bag, creating loose debris which is unduly hazardous in an accident.

If a separate door panel were installed, this increases the cost of manufacture since the door panel must be in proper registry with a precut opening. It would be difficult to achieve a true invisible seam quality by this approach.

It is the object of the present invention to provide an invisible seam air bag deployment opening arrangement in a simple vinyl clad or hard plastic trim piece which does not increase the manufacturing costs of the trim piece excessively and yet provides a reliable way of establishing the opening without creating loose debris.

SUMMARY OF THE INVENTION

The present invention achieves the above recited object by providing an air bag deployment opening in a vinyl clad or painted and grained hard plastic by cutting into the rear face of the vinyl clad or grained substrate to form one or more hinging sections joined on one side to the remaining substrate portions. A stiff reinforcing "patch" panel is fixed to the inside of each of the hinging substrate sections as well as to a perimeter frame. The patch panel is provided with a weakening break along each side except for a hinging side aligned with the hinging side of the substrate hinging section. The patch is sufficiently sturdy to withstand the force of the rapidly inflating air bag without breaking free and, by its attachment to the substrate section, also prevents that structure from breaking free.

The substrate can be cut from the inside after cladding preferably by laser cutting, which can also optionally include preweakening by laser scoring of the inside of the vinyl cladding. The attached side of the substrate sections may also optionally be preweakened.

Alternatively, the substrate may be molded with break lines prior to the vinyl cladding.

The patch panel may be attached to the substrate by various mechanical processes such as heat staking or mechanical fasteners, by various joining processes, i.e., sonic welding, thermopneumatic welding, dielectric bonding, or by adhesive bonding.

The patch panel can also be attached entirely around its perimeter, with a line of weakening formed by molding or cutting on all but its hinging side.

Preferably, a stiffening perimeter frame is attached to the substrate and the attached hinging side of the patch panel.

DESCRIPTION OF THE DRAWINGS

FIG. 2A-1 is a sectional view taken lengthwise along the score shown in FIG. 2A.

FIG. 2B-1 is a sectional view taken lengthwise along the score shown in FIG. 2B.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
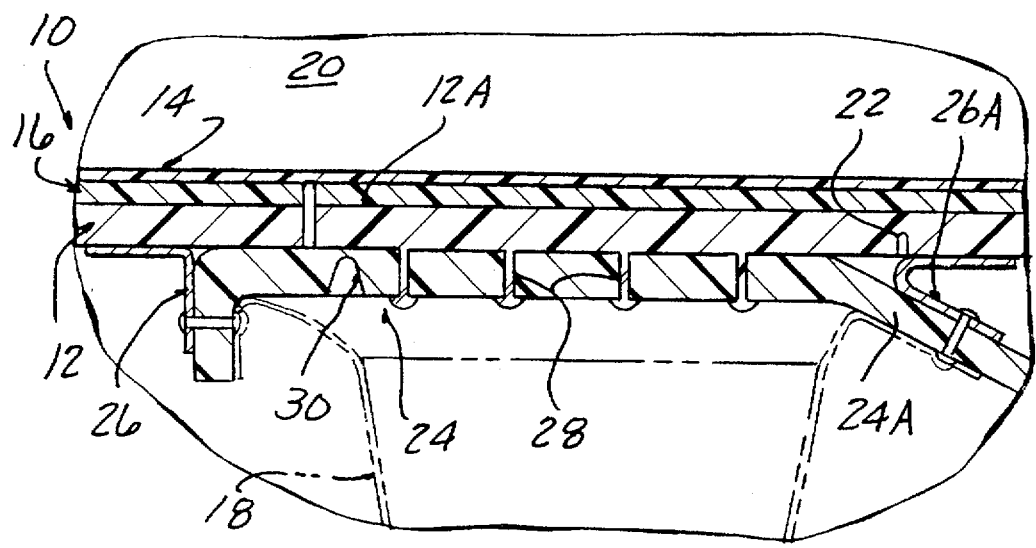
FIG. 1 is a fragmentary sectional view through a vinyl clad trim panel having an invisible seam air bag deployment opening arrangement according to the present invention.
Figure 1A:
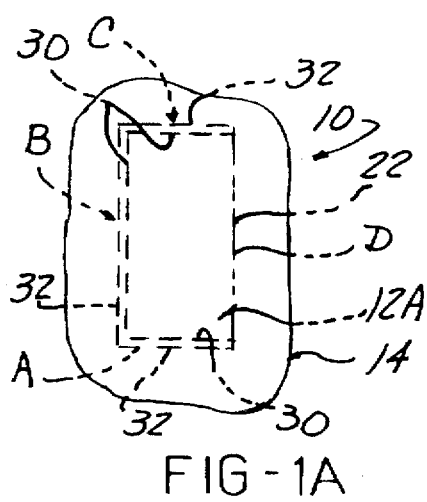
FIG. 1A is a fragmentary plan view of a portion of the trim piece shown in FIG. 1.

Referring to FIG. 1, a portion of an automotive interior trim piece 10 is depicted, of vinyl clad type, in which a rigid plastic substrate panel 12 is overlain by a thin vinyl layer 14, comprising a cosmetic treatment for the outer side of the substrate panel 12. The vinyl layer 14 is underlain with a thin backing layer 16 of gas assisted foam. The vinyl layer 14 and backing layer 16 are typically vacuum formed onto the hard plastic substrate 12.

Such interior trim piece 10 could be an instrument panel for a passenger air bag installation, or a door panel equipped with a side located air bag installation.

An air bag canister 18, containing a folded air bag (not shown) is disposed behind the trim piece 10 at a particular location whereat the air bag is to be deployed by inflating and passing into the passenger compartment 20 through a deployment opening to be formed in the trim piece 10 at that location upon deployment of the air bag.

According to the concept of the invention, the substrate layer 12 is cut (or premolded) with a pattern of preweakening grooves 32A–D to define the three sides A, B, C of one or more sections 12A together defining an air bag deployment opening to be formed when the air bag system is activated. Single door (as shown) or double door or multi-door patterns could also be utilized as described in U.S. Pat. No. 4,893,833; U.S. Pat. No. 4,989,896; and, U.S. Pat. No. 5,342,088, referenced above.

One side D of each section 12A remains attached to the main portion of the substrate 12 to create a hinging axis. A partial scoring 22 along the fourth side may facilitate a hinging action.

A reinforcing patch panel 24 is secured to the inside surface of the substrate section 12A extending to the adjacent regions of the main portion of the substrate 12 and can be formed from sheet metal or plastic material capable of creating a line hinge as described in U.S. Pat. Nos. 4,893,833 and 4,989,896.

A reinforcing frame 26 extends around the sides A, B, C, D of section 12A, attached to the adjacent substrate regions and to the perimeter of the patch panel 24. The reinforcing frame 26 is anchored to limit the deflection of the trim piece 10 in the regions surrounding the deployment opening, as described in detail in U.S. Pat. No. 5,393,088.

The patch panel 24 is fixedly attached to the substrate section 12A as by heat staking of the molded projections 28 extending through openings in the patch panel 24.

Other attachment methods include dielectric bonding, sonic welding, thermal pneumatic welding, mechanical fasteners, and adhesive bonding.

The patch panel 24 is preweakened along the sides A, B, C of the section 12A but at a location spaced slightly inside of the preweakening or severing of the substrate 12.

The patch panel preweakening is accomplished by a reduction in thickness created by a groove 30 which may be cut as by laser cutting, as described in detail in copending U.S. Ser. No. 08/332,565 for "Process for Preweakening an Automotive Trim Cover for an Air Bag Deployment Opening."

The groove 30 may also be premolded as described in U.S. Pat. No. 4,893,853, although cutting is preferred.

The patch panel 24 is attached to the frame 26 at regions which extend beneath the substrate panel 12 beyond the groove 30 so as to bridge the substrate panel grooves 32.

The patch panel 24 has a hinging portion 24A on side D, which may be of reduced thickness, which is attached to frame portion 26A.

The substrate 12 may be formed and the vinyl layer 14 with foam backing vacuum molded thereto.

Thereafter, laser cutting of the preweakening lines is carried out to define section 12A.

The frame 26 and patch panel 24 are then assembled to the trim piece 10, patch panel 24 fixedly secured to substrate panel 12A.

The patch panel 24 is sturdy and ruggedly secured so that it will not break free as it is forced open, severing the outer vinyl layer 14 at deployment of the air bag.

The air bag canister 18 may be attached to the patch panel 24 and frame 26 to form a subassembly which is later installed to the trim piece 10. Or, these may be installed as loose components.

Figure 2A:
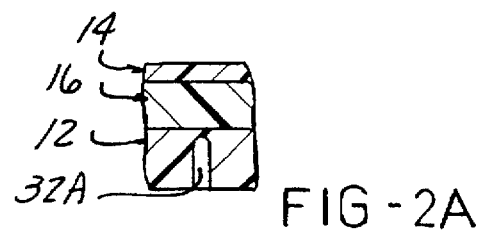
FIG. 2A is an enlarged sectional view taken through the substrate and vinyl cladding showing a scoring mode.

FIGS. 2A and 2A-1 show the preferred form of substrate preweakening, in which a groove or cut 32A extends almost but not quite through the substrate 12, so as to create a slight flash preventing any visible impression being created if the vacuum forming of the outer layer 14 and foam backing layer 16 are conducted afterwards.

Figure 2B:
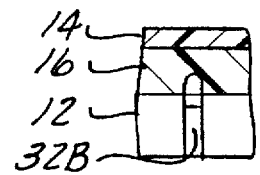
FIG. 2B is an enlarged sectional view taken through the substrate and vinyl cladding along a preweakening line showing a second alternate scoring mode alternating scoring depths of both foam and substrate along that line.
Figures 1, 2A:
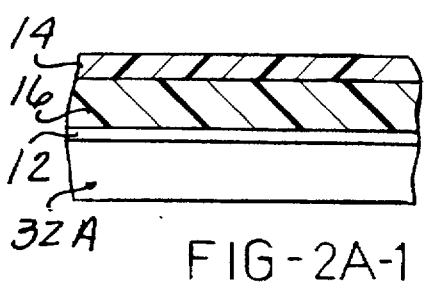
Figure 2C:
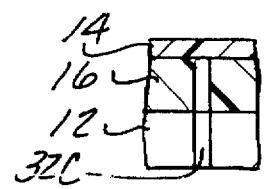
FIG. 2C is an enlarged sectional view taken through the substrate and vinyl cladding along a preweakening line showing a third alternate scoring mode where only the substrate is scored.
Figures 1, 2B:
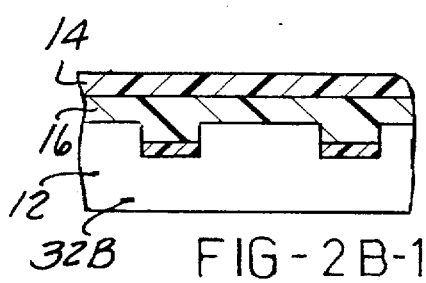
Figure 2D:
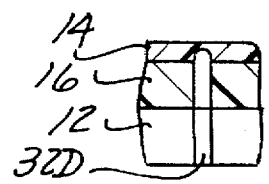
FIG. 2D is an enlarged sectional view taken through the substrate and vinyl cladding along a preweakening line showing a fourth alternate scoring mode.

The cut 32B may also extend completely through the substrate 12 and into the foam backing 16 (as shown in FIG. 2B) at spaced intervals (as shown in FIG. 2B-1) or cut 32C may extend just to the outer layer 14 (as shown in FIG. 2C) or cut 32D may extend slightly into the outer layer 14 (as shown in FIG. 2D).

Figure 3:
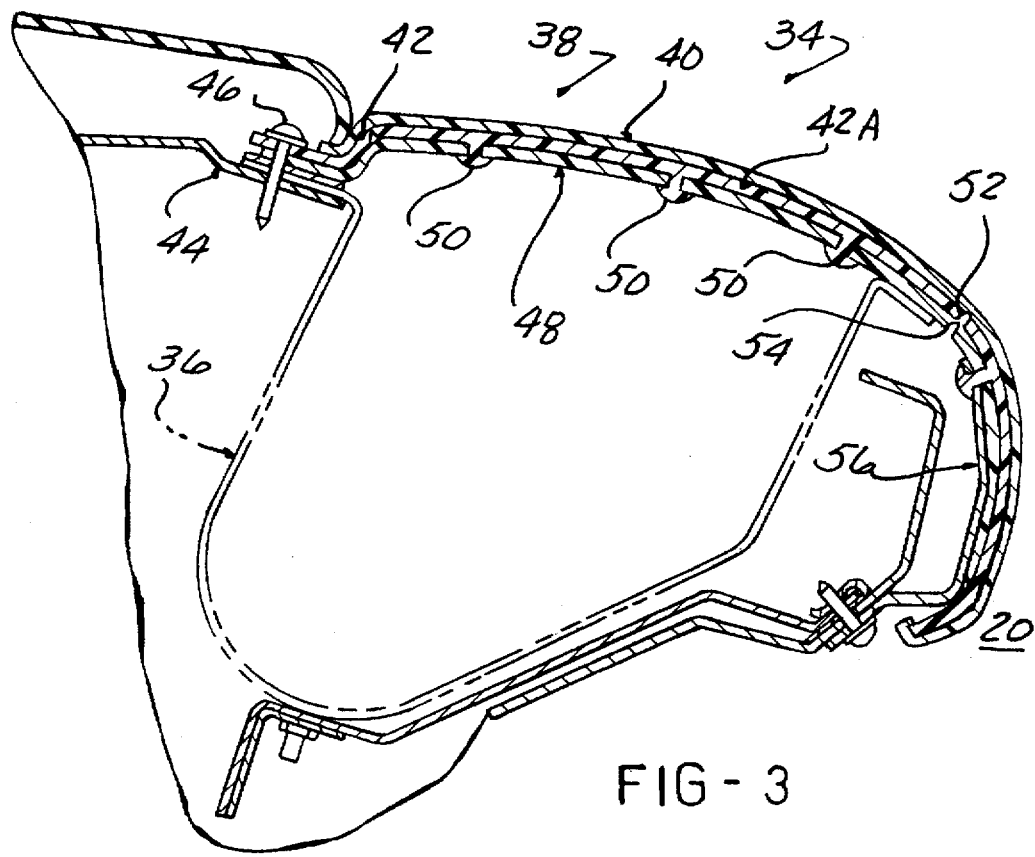
FIG. 3 is a sectional view taken through a vinyl clad instrument panel provided with an air bag deployment opening according to the concept shown in FIG. 1.

FIG. 3 shows an implementation of this concept in an instrument panel 34, which covers a passenger side air bag canister 36.

A trim panel 38 extends generally horizontally and down vertically in front of the passenger compartment 20.

The trim panel 38 is formed of an outer foam backed skin layer 40 overlying a rigid plastic substrate 42, which is secured along its forward edge to an instrument panel substrate 44 with a series of screws 46. An underlying reinforcing patch panel 48 is fixedly secured to the substrate 42 by a series of heat staked molded protrusions 50 distributed across the section 42A of the substrate underlying the patch panel 48, the protrusions 50 penetrating the patch panel 48.

The substrate section 42A overlies the air bag canister 36 which is defined by a preweakening cut 52.

The patch panel 48 is also preweakened on three sides of a region underlying the substrate panel 42A by a cut 54.

The patch panel 48 is anchored along the left side with the screws 46, and on the right by heat staking a sheet metal understructure 56 in an area outside the section 42A.

A reinforcing frame (not shown) would also be included.

The preweakening pattern is not limited to just a "U" pattern, as the concept is applicable to multiple patterns as described in U.S. Pat. No. 5,342,088.

Figure 4:
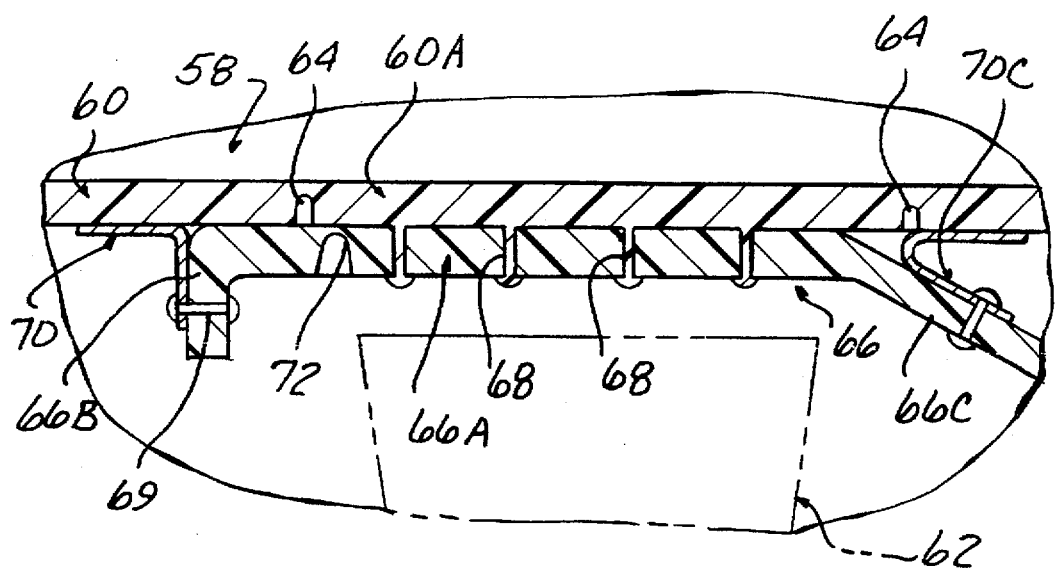
FIG. 4 is a fragmentary sectional view taken through a painted and grained trim panel having an invisible seam air bag deployment opening arrangement according to the present invention.

FIG. 4 illustrates the concept applied to a trim piece 58 composed of a single panel 60 of a painted and grained hard plastic. The panel 60 has a section 60A overlying an air bag canister 62 defined by a line of weakening provided by a laser scoring 64.

A reinforcing patch panel 66 underlies the hard plastic panel 60 and is fixedly secured thereto by heat staking of molded protrusions 68 integral with the hard plastic panel section 60A and extending through holes in the patch panel 66.

The patch panel has an internal flange 66B on one side fixed to a reinforcing frame 70 with heat staked rivets 69. The frame 70 underlies the perimeter of the section 66A and is affixed thereto to limit outward bulging and facilitate fracture of the panel along the score 64.

The patch panel 66 is formed with a hinging section 66C secured to an angled section 70C of the frame 70.

The panel 66 is scored by a laser cut (or molded) groove 72 extending along the remaining sides of the preweakening scoring 64 of the panel 60 at a slightly inwardly spaced location.

Accordingly, a low cost application of the invisible seam technology is provided by the concept of the present invention.

We claim:

1. In combination with an automotive trim piece mounted in a passenger compartment, said trim piece formed by a hard plastic substrate panel having an outer cosmetic surface treatment on an outer side thereof, an arrangement for forming an air bag deployment door comprising:

said substrate panel having a section defined by a preweakening groove pattern formed in an inner side of said substrate panel but not extending through said cosmetic surface treatment, said section defining at least in part an air bag deployment door in said substrate panel;

a reinforcing patch panel fixedly attached to said inner side of said substrate panel, said patch panel having an inner portion substantially coextensive with said substrate panel section which is fixedly attached thereto all across said substrate panel section to reinforce said substrate panel section, said patch panel also having an outer perimeter portion lying beyond said preweakening groove pattern and immediately beneath adjacent regions of said substrate panel outside said preweakening groove pattern so as to bridge said preweakening groove pattern and to reinforce said substrate panel across said preweakening groove pattern in said substrate panel, said patch panel also having one side fixed to structure anchored in said passenger compartment so as to define a hinging axis.

2. The combination according to claim 1 wherein said outer cosmetic treatment comprises an outer layer of foam backed vinyl overlying said substrate.

3. The combination according to claim 2 wherein said preweakening groove pattern extends partially through said substrate panel from said inner side.

4. The combination according to claim 2 wherein said preweakening groove pattern extends completely through said substrate panel and partially into said vinyl outer layer.

5. The combination according to claim 1 wherein said outer cosmetic treatment comprises painting and graining of said outer side of said substrate panel, and wherein said preweakening groove pattern extends only partially into said substrate panel.

6. The combination according to claim 1 wherein said patch panel has a preweakening groove pattern extending beneath each side of said substrate panel section except for said fixed one side of said patch panel.

7. The combination according to claim 6 wherein said patch panel preweakening groove extends slightly inward of said substrate preweakening groove.

8. The combination according to claim 1 wherein said patch panel is attached to said substrate panel section with a series of mechanical attachments extending across said panel section to attach said patch panel portion to said substrate section at intermediate points thereacross.

9. The combination according to claim 1 wherein said patch panel perimeter portion is fixed by means of a stiffening frame extending outside said preweakening groove pattern.

10. A method of enabling formation of an air bag deployment door in a hard plastic automotive interior trim piece, said door aligned with an air bag canister mounted behind said trim piece comprised of a hard plastic substrate panel with a cosmetic treatment on an outer side by inflation of said air bag, comprising the steps of:

preweakening a section of said hard plastic substrate panel by forming a groove extending in a deployment door pattern to form said section of said substrate panel;

fixedly attaching a reinforcing patch panel having an inner portion substantially coextensive with said substrate panel section to an inner side of said substrate section all across said inner portion of said patch panel;

extending said patch panel beneath said preweakening groove pattern to an outer perimeter portion lying beyond said groove pattern so that said patch panel bridges said groove pattern and fixing said outer perimeter portion to reinforce said substrate panel section beneath regions of said substrate panel adjacent said preweakening groove pattern; and, anchoring one side of said patch panel extending beyond said substrate panel section to an anchoring structure to create a hinge axis extending along said one side;

whereby inflation of said air bag will push said patch panel to force said substrate panel section to move away from remaining portions of said substrate.

11. The method according to claim 10 wherein an outer layer of foam backed vinyl is provided on one side of said substrate panel to create said cosmetic treatment.

12. The method according to claim 11 further including the step of laser cutting said preweakening groove pattern into said substrate panel.

13. The method according to claim 12 wherein said groove is laser cut completely through said substrate panel and partially into said vinyl outer layer.

14. The method according to claim 12 further including the step of laser cutting a preweakening groove into said patch panel lying inside of said substrate panel section preweakening groove pattern except on said one side.

15. The method according to claim 11 further including the step of molding said groove pattern into said substrate.

16. The method according to claim 10 further Including the step of mechanically attaching said patch panel inner portion to said substrate panel section within said preweakening pattern.

17. The method according to claim 10 including the step of painting and graining one side of said substrate panel to create said cosmetic treatment and wherein said groove pattern is cut partially into said substrate panel from inside.

18. The method according to claim 10 further including the step of first attaching said air bag canister to an outer perimeter of said patch panel and to a reinforcing frame to form a subassembly, and thereafter attaching said subassembly to said substrate panel outer regions.

\* \* \* \* \*